Patented Mar. 18, 1941

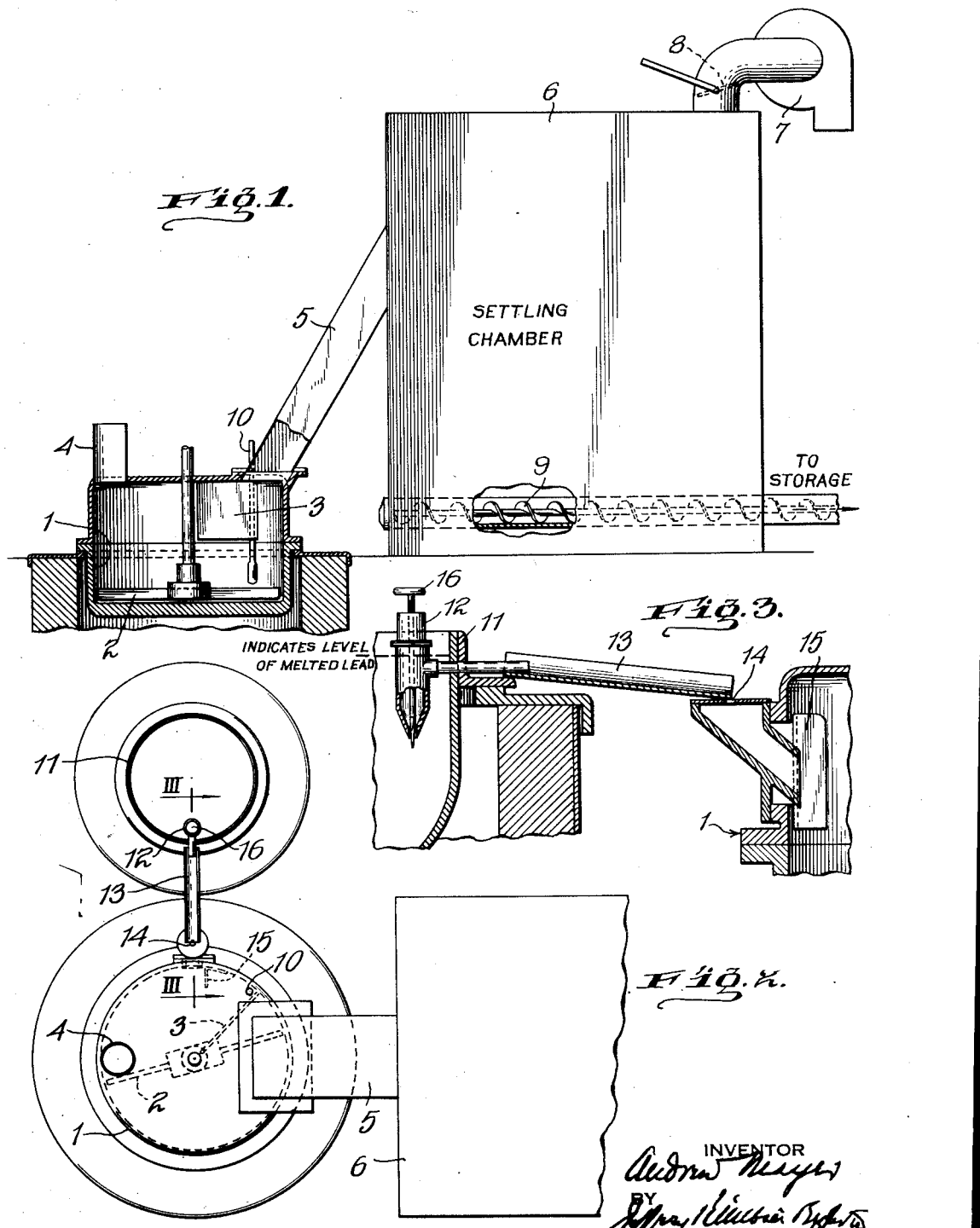

2,235,487

UNITED STATES PATENT OFFICE 2,235,487

MANUFACTURE OF COMPOSITIONS OF LEAD OXIDE (PbO) AND FINELY DIVIDED METALLIC LEAD

Andrew Mayer, Brooklyn, N. Y., assignor to National Lead Company, New York, N. Y., a corporation of New Jersey Application February 10, 1937, Serial No. 125,120
Renewed August 3, 1939

2 Claims. (Cl. 23—146)

Primarily, my invention relates to the production of mixed lead oxide (PbO) and finely divided metallic lead wherein the metallic and oxidized portions are within predetermined limits. More particularly, my invention relates to the production of a homogeneous mixture of finely divided lead oxide (PbO) and metallic lead, such as used for lead storage battery manufacture and other purposes, whereby chemical reactivity in aqueous suspension and solid phase, particle size and distribution, crystal system and modification of the oxide portion, are regulable and within the control of the operator as hereinafter described. Lead oxide in the form of tetragonal crystals is more reactive in solid phase reactions than in the form of orthorhombic crystals which are more reactive in aqueous suspension. The invention enables the product composition to be made with either form predominating, and in a particle size range which may be greater or less as desired, but in any event substantially less than 30 microns average diameter.

Mixed lead and lead oxide has commonly been made heretofore in a so-called oxide pot in which a bath of molten lead is violently stirred or agitated so as to keep a constant suspension or mist of fine molten lead particles in the upper part of the pot which is covered over, and air is passed through the pot which oxidizes the suspended lead and carries off the fine particles to a settling chamber. The reaction is exothermic after the reaction temperature has been initially reached, and continues thereafter without additional heat so long as the lead and air are present. The output of any given pot has not run uniform as to the chemical and physical characteristics of the product including its color. This may be assumed to have been due to the fact that the lead laden atmosphere above the bath varies as to its density or homogeneity under the vagaries of mechanical agitation. In any event attempts to regulate the reaction have been without success. Moreover the need to supply a product of uniform physical or chemical properties, or both, as the case might be, has commonly required the sorting of the product and the subsequent selection therefrom of material within the specifications required, a procedure which was inconvenient and required an inordinate amount of microscopic and chemical testing and other labor.

I have found that this erratic behavior can be controlled so that a desired uniform quality of product can be consistently produced and on a commercial scale, thereby eliminating the complication and inconvenience of making up the product by selection in the manner above referred to. More particularly I have found that by varying the rate of feed of lead to the pot the temperature can be varied and that by supplying molten lead to the pot continuously and regulating the rate of such addition so as to maintain the temperature of the lead bath in the pot within certain prescribed limits, a substantially uniform product will result as to particle size, chemical reactivity, color and other characteristics. I have ascertained that the bath temperature can be thus controlled within limits sufficient to accomplish my purpose simply by regulating the rate of the continuous feed of the metallic lead, an increase producing a higher temperature and vice versa.

To carry out my invention, I arrange the apparatus in the usual way, but supply it with a molten lead lead-feeding device capable of close regulation, and in order to coordinate the metal feed rate to the temperature of the bath, I mount the pyrometer element preferably directly in the bath itself rather than in the space above it.

The temperature of the metal bath is affected by the rate of air supply, but as a means of controlling the bath temperature, the air supply is not susceptible of any great variation since the air flow through the pot must at least be at a rate sufficient to carry off the heavy powder through the uptake flue against gravity. I find nevertheless that I may also use the air feed to supplement the control effected through the metal feed rate to some extent, and that use may be made of this variable to control the size of the product particles and more particularly the percentage of metallic lead in the product. Accordingly I supply a damper which regulates the air rate. Contrary to expectation, increase of the air rate tends to depress the bath temperature and a balanced adjustment of the rates of supply of metal and air can thus be coordinated to the bath temperature enabling me to produce at will, and indefinitely, a product having a constant color and other characteristics, which has not been accomplished heretofore.

By regulating the rate of metal feed to maintain a temperature in the molten bath of 700° F. or within a range not more than 50° higher or lower, the product is substantially uniform throughout the whole run and the oxide component consists predominantly of the tetragonal crystal, the color being greenish-brown and the average diameter of particle by surface mean being about 2 microns. By increasing the metal feed rate so as to hold the bath temperature at 800° F. plus or minus 50°, a similar substantially uniform product is obtained, somewhat larger in particle size, viz., averaging about 3 microns and reddish-brown in color. If the metal bath be held at 900° F. plus or minus 50°, a similar constant product of still larger particle size, viz., averaging about 9 microns, and of a greenish-yellow color is produced. Above 900° F. the color becomes a brighter yellow. The transition from reddish-brown to yellow occurs at between 850° and 900° F. Generally speaking, any particular desired product can be obtained by varying the rate of the lead stream being fed so as to hold the temperature within a maximum range or variation not exceeding 100° F. Inasmuch as the finer particle size, represented by the predominance of tetragonal crystals, is commonly deemed to be most desirable for the manufacture of storage battery plates, the process is usually carried out with the bath temperature maintained constant as stated at some temperature between, say, 700 and 850° F.

The following represents the characteristic relation of temperature and product in a sample run:

| Approximate temperature | 700° F. | 800° F. | 900° F. |
| --- | --- | --- | --- |
| Predominating crystal form | Tetragonal | Tetragonal (in equilibrium with orthorhombic). | Orthorhombic. |
| Approximate free metal | 42% | 20% | 15%. |
| Approximate lead oxide (PbO) content | 58 | 71 | 85. |
| Approximate particle size, average diameter by surface mean. | 2.2 microns | 2.9 microns | 8.8 microns. |
| Approximate particle size distribution: | | | |
| 25% by weight under | 2 microns | 3 microns | 8 microns. |
| 25% by weight over | 6 microns | 9 microns | 16 microns. |
| Color of final product | Greenish brown | Reddish brown | Greenish yellow. |

The accompanying drawing represents apparatus appropriately equipped for controlling the temperature of the metal bath within the operating ranges above referred to—

Fig. 1 being an elevation;
Fig. 2 a plan, and
Fig. 3 a detail in section on the line III—III of Fig. 2.

The pot 1, appropriately mounted so as to be capable of being initially heated by flame as usual, has the usual stirrer 2 driven at about 150 R. P. M. constant speed, by a motor drive not shown, a fixed baffle or dash plate 3, an air inlet 4 and offtake 5 leading to the settling chamber 6, from which the dusty gas is withdrawn by a fan 7 under the control of a damper 8, and from which the finished product, settling in the chamber 6, is removed by a conveyor 9. The flue 5 requires to be at a slope of not less than 60° to horizontal.

The pyrometer element indicated at 10 is appropriately mounted in the pot cover or otherwise, its sensitive end being located preferably as close as possible to the path of the stirrer where it is in contact solely or mainly with metallic lead. In this position it requires to be firmly braced against the pressure of the lead, which is done by attaching it to the pot wall. The indications of the pyrometer so located afford a far more accurate means of temperature control than if it were located elsewhere.

Lead melted in a feed pot 11, wherein the temperature and level are kept substantially constant by any suitable means, is delivered to the oxide pot through a T-valve fitting 12 and a trough 13 which discharges into a small hole 14 which leads the lead into the upper part of the pot at an opening protected against the splash by a guard plate 15. The regulation of the feed is by means of any form of calibrated outlet or otherwise, and may be, for example, by means of a tapered needle valve 16 or the like, it being noted that the valve fitting is at all times submerged below the level of the lead. When a needle valve is employed it is loosely supported on the valve body so that occasional stoppages can be quickly cleared. In starting the process, the initial temperature having been reached, enough lead is first run into the pot to insure that the stirrer shall be more or less submerged in metallic lead while in operation and thereafter the rate of metal feed as described will maintain such an amount of metal constantly in the pot, thereby insuring, among other things, that the pyrometer shall be in constant contact with the metal.

The following is claimed:

1. Process for producing a mixture comprising the tetragonal form of lead monoxide and lead, said process comprising passing a stream of air into contact with a bath of molten lead and molten lead particles above said bath while said bath of molten lead is being agitated in such a manner as to throw off said molten lead particles therefrom and while said bath of molten lead is at a temperature within the range of 650° F. to 750° F., inclusive; and while said agitation is continued and the rate of flow of said stream of air is such as to carry away fine particles of said mixture formed by contact of said stream of air with said bath and particles of molten lead, feeding molten lead to said bath of molten lead; and so changing the rate of said feeding of molten lead when the temperature of the bath departs from said range that the temperature of the bath of molten lead is restored within said range.

2. Process for continuously producing a mixture composed of fine lead particles, tetragonal PbO crystals and orthorhombic PbO crystals, such mixture having a predetermined color determined by the relative proportions of the aforesaid components, which consists in passing a stream of air into contact with a bath of molten lead and molten lead particles above said bath, while the bath is being agitated in such manner as to throw off said molten lead particles therefrom and, while said agitation is continued and the rate of flow of said stream of air is such as to carry away fine particles of said mixture formed by reaction of said air with said bath and molten lead particles, feeding molten lead to said bath at a variable rate of feed, maintaining the temperature of the bath within a maximum variation of 100° F. by increasing said rate of feed when the reaction temperature shows signs of falling and diminishing said rate of feed when the reaction temperature shows signs of rising and continuing such variation of the feeding rate for the duration of the process in such manner as to yield a product mixture of substantially non-varying color effect, and composition characteristics.

ANDREW MAYER.